United States Patent
Ueno et al.

(10) Patent No.: US 10,478,734 B2
(45) Date of Patent: Nov. 19, 2019

(54) GAME CONTROL PROGRAM, GAME CONTROL METHOD, AND GAME CONTROL DEVICE

(71) Applicant: CYGAMES, INC., Tokyo (JP)

(72) Inventors: Takafumi Ueno, Tokyo (JP); Shoji Kawano, Tokyo (JP)

(73) Assignee: CYGAMES, INC., Tokyo (JP)

(*) Notice: Subject to any disclaimer, the term of this patent is extended or adjusted under 35 U.S.C. 154(b) by 191 days.

(21) Appl. No.: 15/633,219

(22) Filed: Jun. 26, 2017

(65) Prior Publication Data
US 2017/0291110 A1    Oct. 12, 2017

Related U.S. Application Data

(63) Continuation of application No. PCT/JP2015/080709, filed on Oct. 30, 2015.

(30) Foreign Application Priority Data

Dec. 26, 2014 (JP) .................................. 2014-264333

(51) Int. Cl.
*A63F 13/825* (2014.01)
*A63F 13/42* (2014.01)
(Continued)

(52) U.S. Cl.
CPC ........ *A63F 13/825* (2014.09); *A63F 13/2145* (2014.09); *A63F 13/42* (2014.09);
(Continued)

(58) Field of Classification Search
CPC .... A63F 13/825; A63F 13/2145; A63F 13/42; A63F 13/426; A63F 13/537; A63F 13/55; A63F 13/58; A63F 2300/65
See application file for complete search history.

(56) References Cited

U.S. PATENT DOCUMENTS 9,283,473 B2    3/2016  Tagawa et al.
9,448,634 B1 *  9/2016  Wakeford ............... G06F 3/017
(Continued)

FOREIGN PATENT DOCUMENTS

JP    2006-181286 A    7/2006
JP    2011-194269 A    10/2011
(Continued)

OTHER PUBLICATIONS

International Search Report issued in Application No. PCT/JP2015/080709, dated Jan. 26, 2016 (2 pages).

*Primary Examiner* — Werner G Garner
(74) *Attorney, Agent, or Firm* — Osha Liang LLP

(57) ABSTRACT

An object of the present invention is to provide a game control program, a game control method, and a game control device with which the operability regarding movement instructions for a game character can be improved. A game control device 1 includes a touchscreen 10; a first determination unit 32 that determines, as a first touch operation, an operation in which contact with the touchscreen 10 is maintained and in which the contact position is moved continuously; a trajectory generating unit 33 that generates an anticipated movement trajectory of a character in the game in accordance with the direction and movement amount of the first touch operation; a second determination unit 35 that determines, as a second touch operation, new contact with the touchscreen 10 while the contact in the first touch operation is being continued; and a trajectory changing unit 36 that changes the anticipated movement trajectory in accordance with the kind, contact position, or movement amount of the second touch operation.

3 Claims, 6 Drawing Sheets

(51) Int. Cl.
  *A63F 13/58*    (2014.01)
  *A63F 13/426*   (2014.01)
  *A63F 13/55*    (2014.01)
  *A63F 13/2145*  (2014.01)
  *A63F 13/537*   (2014.01)

(52) U.S. Cl.
  CPC .......... *A63F 13/426* (2014.09); *A63F 13/537* (2014.09); *A63F 13/55* (2014.09); *A63F 13/58* (2014.09); *A63F 2300/65* (2013.01)

(56) References Cited

U.S. PATENT DOCUMENTS

2014/0121012 A1  5/2014  Tagawa et al.
2016/0041747 A1  2/2016  Maekawa

FOREIGN PATENT DOCUMENTS

JP    2014-083395 A    5/2014
JP    2014-215888 A    11/2014

* cited by examiner

GAME CONTROL PROGRAM, GAME CONTROL METHOD, AND GAME CONTROL DEVICE

TECHNICAL FIELD

The present invention relates to game control programs, game control methods, and game control devices for controlling the execution of a game.

BACKGROUND ART

Technologies for controlling character moves via a touchscreen instead of a physical controller for accepting inputs from a player in game control devices have been previously proposed (e.g., see Patent Literature 1). Furthermore, technologies for changing parameter setting values by using drag operations on a touchscreen have also been proposed (e.g., see Patent Literature 2).

Patent Literature 1: Japanese Unexamined Patent Application, Publication No. 2006-181286

Patent Literature 2: Japanese Unexamined Patent Application, Publication No. 2014-215888

DISCLOSURE OF THE INVENTION

Problems to be Solved by the Invention

However, since instructions for character movement and setting of parameters are usually accepted individually via independent control operations, it has been the case, for example, that the kind of character moving method or a parameter regarding the screen display is set before issuing a movement instruction. Thus, it has not been possible for a player to perform a setting operation simultaneously in the middle of a movement instruction.

It is an object of the present invention to provide a game control program, a game control method, and a game control device with which the operability regarding movement instructions for a game character can be improved.

Means for Solving the Problems

A non-transitory computer readable medium storing a game control program according to the present invention causes a computer that controls the execution of a game to execute control processing including a first determining step of determining, as a first touch operation, an operation in which a contact with a touchscreen is maintained and in which the contact position is moved continuously; a trajectory generating step of generating an anticipated movement trajectory of a character in the game in accordance with the direction and movement amount of the first touch operation; a second determining step of determining, as a second touch operation, new contact with the touchscreen while the contact in the first touch operation is being continued; and a trajectory changing step of changing the anticipated movement trajectory in accordance with the kind, contact position, or movement amount of the second touch operation.

In the control processing, a display mode in the game may be changed in accordance with the kind, contact position, or movement amount of the second touch operation.

The second touch operation may be an operation involving contact with a certain area on the touchscreen.

The second touch operation may be an operation involving contact with an area relative to the contact position and movement direction in the first touch operation.

The second touch operation may be an operation involving movement of at least one of a plurality of contact positions.

A game control method according to the present invention is a game control method in which a computer controls the execution of a game, wherein control processing that is executed includes a first determining step of determining, as a first touch operation, an operation in which contact with a touchscreen is maintained and in which the contact position is moved continuously; a trajectory generating step of generating an anticipated movement trajectory of a character in the game in accordance with the direction and movement amount of the first touch operation; a second determining step of determining, as a second touch operation, new contact with the touchscreen while the contact in the first touch operation is being continued; and a trajectory changing step of changing the anticipated movement trajectory in accordance with the kind, contact position, or movement amount of the second touch operation.

A game control device according to the present invention is a game control device that controls the execution of a game, the game control device including a touchscreen; a first determination unit that determines, as a first touch operation, an operation in which contact with the touchscreen is maintained and in which the contact position is moved continuously; a trajectory generating unit that generates an anticipated movement trajectory of a character in the game in accordance with the direction and movement amount of the first touch operation; a second determination unit that determines, as a second touch operation, new contact with the touchscreen while the contact in the first touch operation is being continued; and a trajectory changing unit that changes the anticipated movement trajectory in accordance with the kind, contact position, or movement amount of the second touch operation.

Effects of the Invention

According to the present invention, a player can view an anticipated movement trajectory in the middle of a first touch operation, which is a movement instruction for a character in a game, can decide a movement instruction while predicting the result of movement processing for the character, and can change the anticipated movement trajectory with a second touch operation. Accordingly, the player can consider a more suitable moving method without having to interrupt the movement instruction, which improves the operability of the game.

PREFERRED MODE FOR CARRYING OUT THE INVENTION

An example embodiment of the present invention will be described below. A game control device 1 according to the present invention is a device that controls the execution of a game for which operational inputs are accepted via a touchscreen, and may be, for example, a portable device such as a smartphone, a tablet, or a portable game machine, or an installed device such as a PC or a special game machine.

Figure 1:
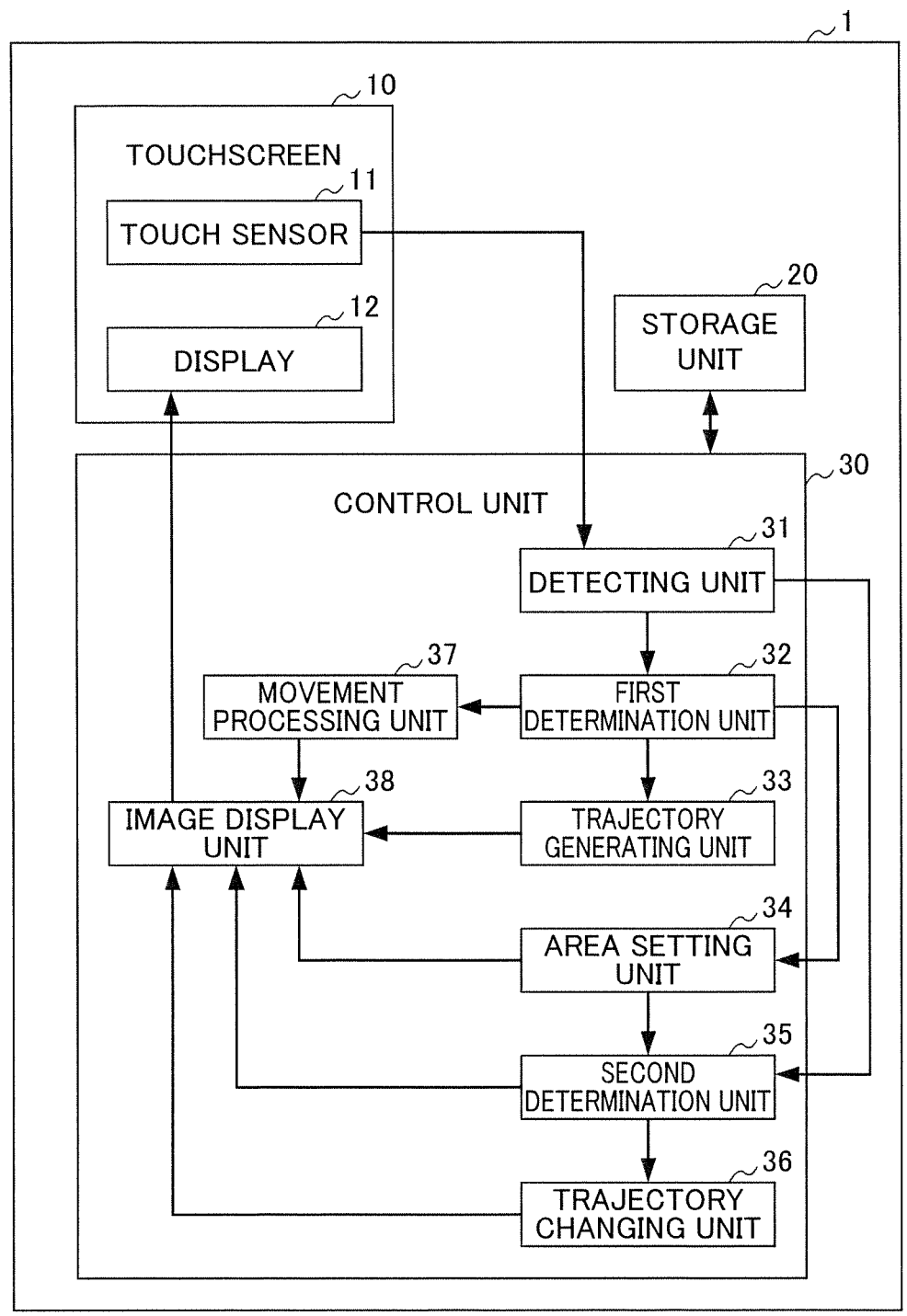
FIG. 1 is a block diagram showing the functional configuration of a game control device according to an embodiment.

FIG. 1 is a block diagram showing the functional configuration of the game control device 1 according to this embodiment. The game control device 1 includes a touchscreen 10, a storage unit 20, and a control unit 30.

The touchscreen 10 is an input/output device for the game, which detects operational inputs from a player and displays a game playing screen. The touchscreen 10 includes a touch sensor 11 that detects a player's finger, etc. brought into contact therewith or in proximity thereto and a display 12 that is disposed so as to overlap the area of the touch sensor.

Hereinafter, what is simply referred to as "contact" or "touch" refers to a user's operation that can be detected by the touch sensor 11, including bringing something into contact therewith or in proximity thereto.

The touch sensor 11 is a touch sensor of the type that is capable of simultaneously detecting touching at multiple points, and the touchscreen 10 is, for example, a capacitive projection touchscreen.

The storage unit 20 is a storage area for various programs, various data, etc. that enable a hardware suite to function as the game control device 1. Specifically, the storage unit 20 stores a program (game control program) that is executed by the control unit 30 in order to realize various functions in this embodiment.

The control unit 30 is a unit that controls the game control device 1 as a whole and realizes various functions in this embodiment in cooperation with the hardware by reading and executing, as appropriate, the various programs stored in the storage unit 20. The control unit 30 may be a CPU (Central Processing Unit).

The control unit 30 discriminates among the kinds of touch operations on the basis of contact, a contact position, a contact period, or the number of contacts with the touchscreen 10. The kinds of touch operations include touch, long touch, release, swipe, tap, double tap, long tap, drag, flick, pinch-in, pinch-out, etc.

A touch is an operation in which the touchscreen 10 is touched. A long touch is an operation in which contact is maintained with the touchscreen 10 for at least a certain period. A release is an operation in which the finger is removed from the touchscreen. A swipe is an operation in which the touched position is moved while keeping contact with the touchscreen 10.

A tap is an operation in which the finger is released without moving the touched position following a touch. A double tap is an operation in which two successive tap operations are performed. A long tap is an operation in which the finger is released without moving the touched position following a long touch.

A drag is a swipe operation involving movement or shape change of an object displayed on the display 12 as a result of a touch operation. A flick is an operation in which the finger is released while moving the touched position in one direction at high speed following a touch.

A pinch-in is an operation in which two points are touched and then swiping is performed from one or both of the touched positions in a direction in which the touched positions become closer to each other. A pinch-out is an operation in which two points are touched and then swiping is performed from one or both of the touched positions in a direction in which the touched positions become farther from each other.

The control unit 30 includes a detecting unit 31, a first determination unit 32, a trajectory generating unit 33, an area setting unit 34, a second determination unit 35, a trajectory changing unit 36, a movement processing unit 37, and an image display unit 38.

The detecting unit 31 detects a touched position when contact is detected by the touch sensor 11. In this embodiment, since the touch sensor 11 and the display 12 overlap each other, the contact position with the touch sensor 11 and the contact position with the display 12 coincide with each other in plan view.

The first determination unit 32 determines an operation in which contact with the touch sensor 11, detected by the detecting unit 31, is maintained and in which the contact position is continuously moved (a swipe, a drag, a flick, etc.) as a first touch operation and accepts the first touch operation as an instruction for moving a character in the game. The touched position that serves as a start point of the first touch operation is not limited and may be an arbitrary position on the touchscreen 10.

The trajectory generating unit 33 generates an anticipated movement trajectory of the character in the game in accordance with the direction and amount of movement of the first touch operation determined by the first determination unit 32. Specifically, for example, the trajectory generating unit 33 generates an anticipated movement trajectory having a distance corresponding to the magnitude of the movement amount in a direction opposite to the direction of the first touch operation.

The area setting unit 34 sets an area for accepting contact detected by the touch sensor 11 as a certain operational input. For example, the area setting unit 34 sets areas for accepting various setting changes and instructions about the proceedings of the game, such as instructions for character actions, in accordance with tap and other operations as well as the first touch operation. Furthermore, in this embodiment in particular, the area setting unit 34 sets an area for the second determination unit 35 to accept a second touch operation while the first touch operation is being accepted by the first determination unit 32.

The second determination unit 35 determines and accepts new contact with the touchscreen 10 as a second touch operation while the contact in the first touch operation is being maintained. The second touch operation may be a tap or other operation for which the touched position is not limited. In this case, for example, each time a tap operation is accepted, the trajectory changing unit 36 functions to execute trajectory changing processing in accordance with the number of tap operations, as will be described later.

Alternatively, for example, the second touch operation may be an operation involving contact with a certain area set on the touchscreen 10 by the area setting unit 34. Alternatively, for example, the second touch operation may be an operation involving contact with an area set by the area setting unit 34 at a position relative to the contact position and direction of movement in the first touch operation. In these cases, each time a tap operation in the set certain area is accepted, trajectory changing processing is executed by the trajectory changing unit 36, as described later, or display-mode changing processing (e.g., enlarging or reducing the screen) is executed by the image display unit 38, as processing corresponding to each area.

Alternatively, for example, the second touch operation may be an operation involving movement of at least one of a plurality of contact positions (e.g., a pinch-in or a pinch-out). In this case, display-mode changing processing (e.g., increasing or decreasing the display magnification factor of the screen) is executed by the image display unit 38 in accordance with the amount of the pinch-in or pinch-out operation.

As described above, during the first touch operation, the second determination unit 35 accepts a second touch (e.g., a tap) or second and third touches (e.g., a pinch-in or a pinch-out) as a second touch operation that is distinct from the first touch operation. This allows the player to give inputs for various settings while performing the first touch operation.

The trajectory changing unit 36 changes the anticipated movement trajectory in accordance with the kind, contact position, or amount of movement of the second touch operation. Specifically, for example, in the case where an anticipated movement trajectory in the form of a straight line is generated in the initial state, the trajectory changing unit 36 switches among the kinds of movement paths, such as jump and curve, each time the second touch operation is accepted.

The movement processing unit 37 sets a moving method for the character corresponding to the kind of the anticipated movement trajectory and determines the movement direction and distance of the character corresponding to the direction and distance of the first touch operation in response to the termination of the first touch operation accepted by the first determination unit. Then, the movement processing unit 37 moves the character and updates the internal status and play screen of the game in cooperation with the image display unit 38.

The image display unit 38 displays various images on the display 12. Specifically, in response to touch operations accepted by the first determination unit 32 and the second determination unit 35, the image display unit 38 displays a play screen including a game character, an anticipated movement trajectory for the character, and images indicating touch areas for individual instructions about the character, display setting, etc. Furthermore, in the case where the second touch operation for changing the display mode is accepted by the second determination unit 35, the image display unit 38 changes the display mode for the game in accordance with the kind, contact position, or amount of movement of the second touch operation. Furthermore, the image display unit 38 executes updating of the game screen, involving character movement, according to instructions determined in response to the termination of the first touch operation.

Figure 2:
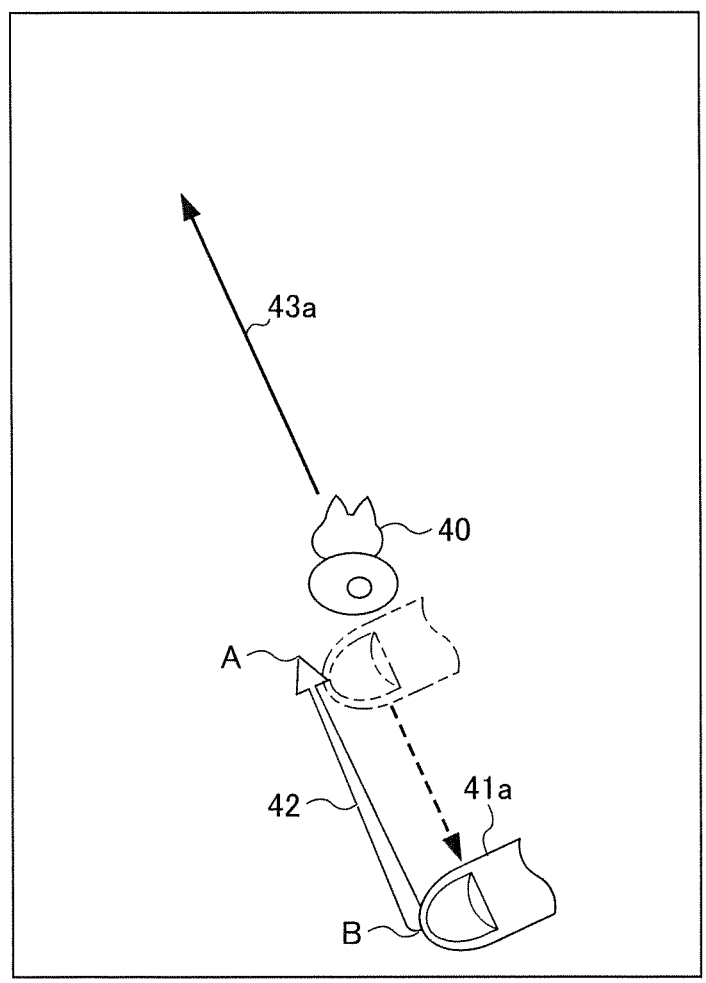
FIG. 2 is an illustration showing an example of a game play screen during a first touch operation according to the embodiment.

FIG. 2 is an illustration showing an example of the game play screen during the first touch operation in this embodiment. This example shows a state in which, as the first touch operation, the player performs a drag operation with a finger 41*a* from an arbitrary start point A to a point B on the screen of the display 12 in which a character 40 is displayed as a three-dimensional object located in a game space represented as a pseudo-three-dimensional space. Although objects other than the character 40 and other images in the game space (e.g., a background image, an image of the ground surface for the character 40, etc.) are not shown in order to simplify the explanation, character objects located in the game space are not limited to the character 40, and other kinds of images may also be displayed. The game space and the character 40 are displayed on the display 12 by the image display unit 38. Methods for locating character objects in the game space and displaying them on the screen can be implemented with many known technologies, and thus detailed descriptions thereof will be omitted.

In FIG. 2, it is assumed that the finger 41*a* of the player is kept in contact with the touchscreen 10 and is not released. The current touched position of the finger 41*a* is the point B, and an arrow 42 is displayed as an image indicating the direction and length corresponding to the drag operation to the point B with reference to the start point A of the touch operation. When the touched position (point B) of the finger 41*a* is moved further, the direction and length of the arrow 42 change. In this embodiment, the amount of movement of the character 40 in the game space is fixed in accordance with the in-plane distance from the start point A to the point B when the finger 41*a* is released, and the direction of movement of the character 40 is determined on the basis of the relative positional relationship between the position of the point A and the position of the point B. For example, the amount of movement and direction of movement regarding the movement of the character 40 can be calculated by using the distance between the point A and the point B and the direction of the point B with reference to the point A, calculated from the horizontal coordinate XA and vertical coordinate YA of the point A and the horizontal coordinate XB and vertical coordinate YB of the point B, in plan view. The control unit 30 determines the amount and direction of movement when the finger 41*a* is released. However, the final amount and direction of movement of the character 40 can be modified as appropriate before being fixed in accordance with the proceedings of the game, etc. The movement processing for the character 40 is executed by the control unit 30 (the movement processing unit 37) after the amount of movement and direction of movement are fixed.

Furthermore, while the drag operation is being continued, an anticipated movement trajectory 43*a* is displayed in synchronization with the display of the arrow 42. Furthermore, the anticipated movement trajectory 43*a* is displayed in accordance with the relative relationship between the position of the point A and the position of the point B, and the display thereof changes when the point B is moved by the drag operation. That is, in the case where a movement instruction indicated by the arrow 42 is given, the direction and distance of movement are shown to indicate an estimated destination of the character 40. The anticipated movement trajectory 43*a* allows the player to predict movement of the character 40, and the display thereof is changed in synchronization with the movement of the point B, with relevance to the amount of movement and direction of movement of the character 40, until the finger 41*a* is released. Furthermore, the anticipated movement trajectory 43*a* also changes with the second touch operation, as will be described later. Since the anticipated movement trajectory 43*a* is displayed while the first touch operation is being continued, the player can imagine the result of the movement after a movement instruction for the character 40 is determined. It is to be noted that the character 40 need not necessarily move along the anticipated movement trajectory 43*a*. Although the anticipated movement trajectory 43*a* serves as an estimate in this embodiment, it is possible to embody the present invention even in the case where the character 40 does not move along the anticipated movement trajectory 43*a*.

Figure 3:
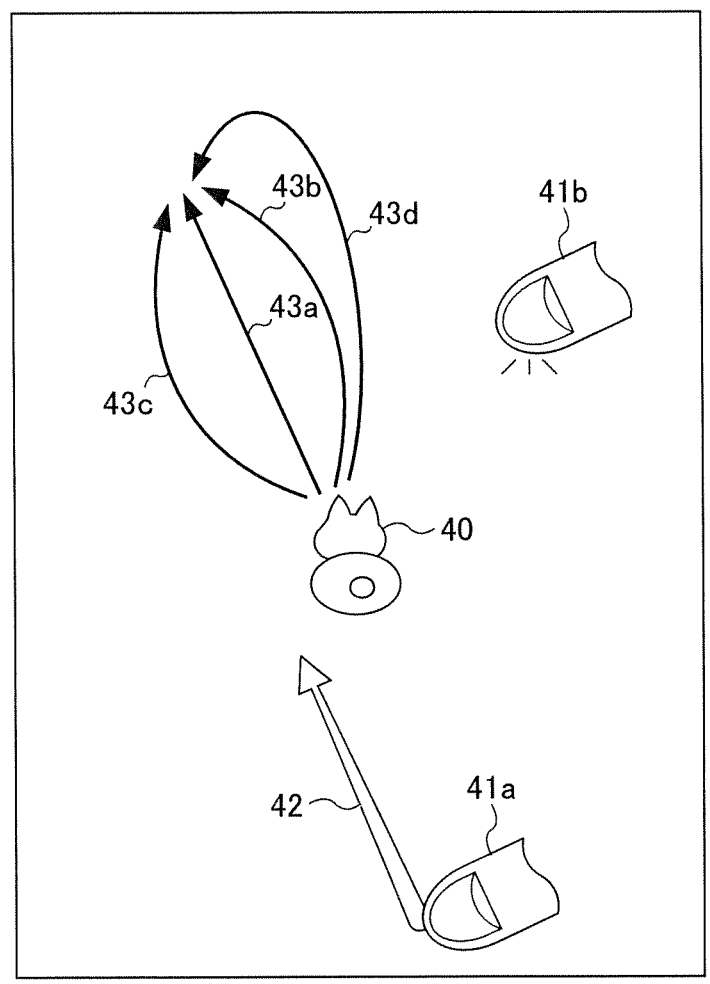
FIG. 3 is an illustration showing a first example of the game play screen while the first touch operation is being continued, according to the embodiment.

FIG. 3 is an illustration showing a first example of the game play screen while the first touch operation is being continued in this embodiment. This example shows a state in which the player performs a tap operation with a finger 41b as the second touch operation during the first touch operation (FIG. 2). The position at which the second touch operation can be accepted is not limited. In accordance with the number of tap operations constituting the second touch operation accepted while the first touch operation is being continued, the trajectory changing unit 36 sequentially switches among predetermined kinds of anticipated movement trajectories (e.g., 43a, 43b, 43c, and 43d) for the character 40 to move to a destination. The player can switch to an anticipated movement trajectory relevant to movement processing for the character 40 in accordance with the game scene while displaying the anticipated movement trajectories on the display 12 with the first touch operation. Thus, the player can decide movement instructions while choosing a preferred moving method.

Furthermore, as a second example of the game play screen while the first touch operation is being continued in this embodiment, a case where the player performs a pinch-in or a pinch-out with two fingers as the second touch operation during the first touch operation (FIG. 2) will be described. In the case where a pinch-in is accepted as the second touch operation during the first touch operation, the image display unit 38 decreases the display magnification factor of the game space, including the display of the character 40, in accordance with the amount of the pinch-in operation. In this case, the ratios of display of various images to the display area of the display 12 also decrease relatively. Thus, the display on the screen changes in a zoom-out fashion, and the range of the game space displayed on the display 12 increases accordingly.

In the case where a pinch-out is accepted as the second touch operation during the first touch operation, the image display unit 38 increases the display magnification factor of the game space, including the display of the character 40, in accordance with the amount of the pinch-out operation. In this case, the ratios of display of various images to the display area of the display 12 also increase relatively. Thus, the display of the screen changes in a zoom-in fashion, and the range of the game space displayed on the display 12 decreases accordingly.

The player can zoom-in or zoom-out the display of the game space, including the character 40, in accordance with the game scene while giving inputs for instructions about movement of the character 40 with the first touch operation. Thus, the player can view the game space at a display magnification factor that is suitable for the game scene.

Figure 4:
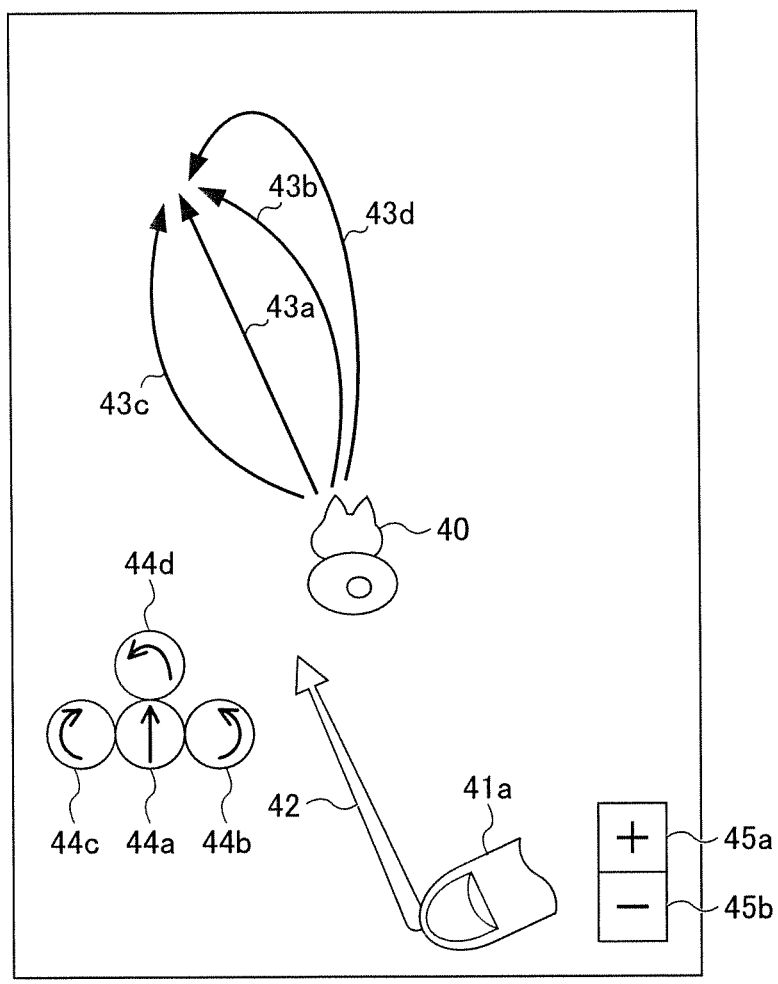
FIG. 4 is an illustration showing a third example of the game play screen while the first touch operation is being continued, according to the embodiment.

FIG. 4 is an illustration showing a third example of the game play screen while the first touch operation is being continued in this embodiment. In this example, the area setting unit 34 sets tap areas 44a to 44d for switching to the anticipated movement trajectories 43a to 43d, respectively, a tap area 45a for increasing the display magnification factor of the play screen, and a tap area 45b for decreasing the display magnification factor of the play screen, and corresponding images are displayed individually at the positions of the individual tap areas. Furthermore, in this example, the tap areas 44a to 44d, 45a, and 45b are set during the first touch operation (FIG. 2). Since the tap areas are set after the first touch operation is accepted, the position at which the first touch operation can be accepted is not restricted by the tap areas. However, the area setting unit 34 may preset and display the tap areas before the first touch operation is accepted.

Furthermore, the area setting unit 34 dynamically moves and sets the tap areas with reference to changes in the relative positional relationship between the start point A and the point B, in plan view, or the position and orientation of the arrow 42, which serves to improve the visibility of the play screen. In response to tapping of these regions during the first touch operation, switching among the corresponding anticipated movement trajectories 43a to 43d or display-mode changing processing is executed.

Next, processing that is executed when the finger 41a is released to terminate the first touch operation will be described. When the finger 41a is released, the amount of movement and direction of movement of the character 40 are fixed, as described earlier, and the kind of movement of the character 40 is fixed in accordance with the kind of the anticipated movement trajectory (one of 43a, 43b, 43c, and 43d) that has been displayed immediately before the release, and then, movement processing for the character 40 is executed. The kind of movement is fixed and the movement processing is executed through cooperation between the movement processing unit 37 and the image display unit 38 of the control unit 30 (FIG. 1).

The movement processing unit 37 fixes the kind of movement of the character 40 in accordance with the kind of the anticipated movement trajectory, sets the specifics of the movement in accordance with the amount of movement, direction of movement, and kind of movement, and executes movement processing for the character 40 on the basis of the specifics of the movement. The image display unit 38 changes the display position of the character 40, etc. on the basis of the specifics of the movement set by the movement processing unit 37. However, the specifics of the movement set by the movement processing unit 37 immediately after the release are not necessarily kept unchanged until completion of the movement processing and are allowed to be changed immediately after the execution of the movement processing. For example, when the character 40 collides with another object (not shown) located in the same game space as the character 40 or collides with a surface indicated by an image representing a wall or floor after the movement processing for the character 40 is executed, the movement processing unit 37 executes the movement processing while changing the specifics of the movement as appropriate. Such changes in the specifics of the movement may include the kind of movement, the amount of movement, and the direction of movement of the character 40. Which of these is to be changed is determined as appropriate in accordance with the proceedings of the game. Furthermore, the execution of the movement processing is continued in accordance with the amount of movement. For example, the movement processing is completed when the amount of movement is decreased while the character 40 is being moved and the remaining amount of movement becomes zero, and waiting for the input of a next movement instruction is started. Furthermore, during the execution of the movement processing, the control unit 30 disables input of a movement instruction from the player. More specifically, even if the touch sensor 11 detects a touch, the control unit 30 does not accept input.

Next, the kinds of movement will be described. The kinds of movement are predefined so as to individually correspond to the anticipated movement trajectories 43a, 43b, 43c, and 43d in FIG. 4. The kind of movement corresponding to the anticipated movement trajectory 43a is "straight," with which the movement processing unit 37 causes the character 40 to move in a path like a straight line. The kind of movement corresponding to the anticipated movement trajectories 43b and 43c is "curve," with which the movement processing unit 37 causes the character 40 to move in a path like a curved line while keeping the character 40 grounded on the surface where the character 40 has been grounded in the game space. The kind of movement corresponding to the anticipated movement trajectory 43d is "jump," with which the movement processing unit 37 causes the character 40 to move while temporarily leaving the surface where the character 40 has been grounded in the game space. In the present invention, kinds of movement other than these four examples may be set as appropriate in accordance with the nature of the game.

Figure 5:
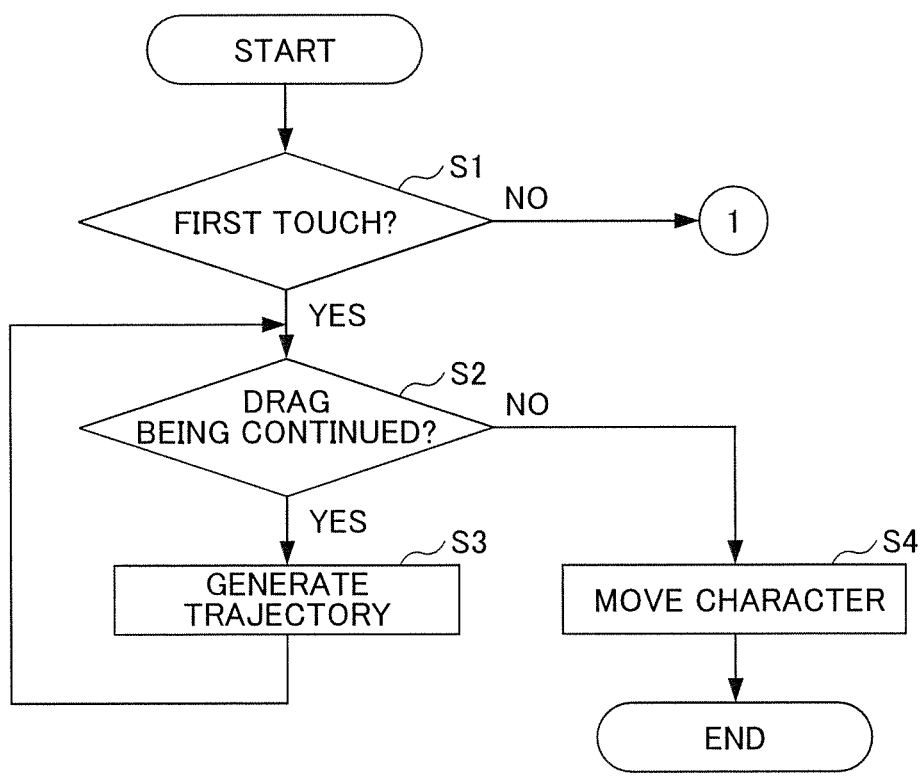
FIG. 5 is a first flowchart showing control processing according to the embodiment.
Figure 6:
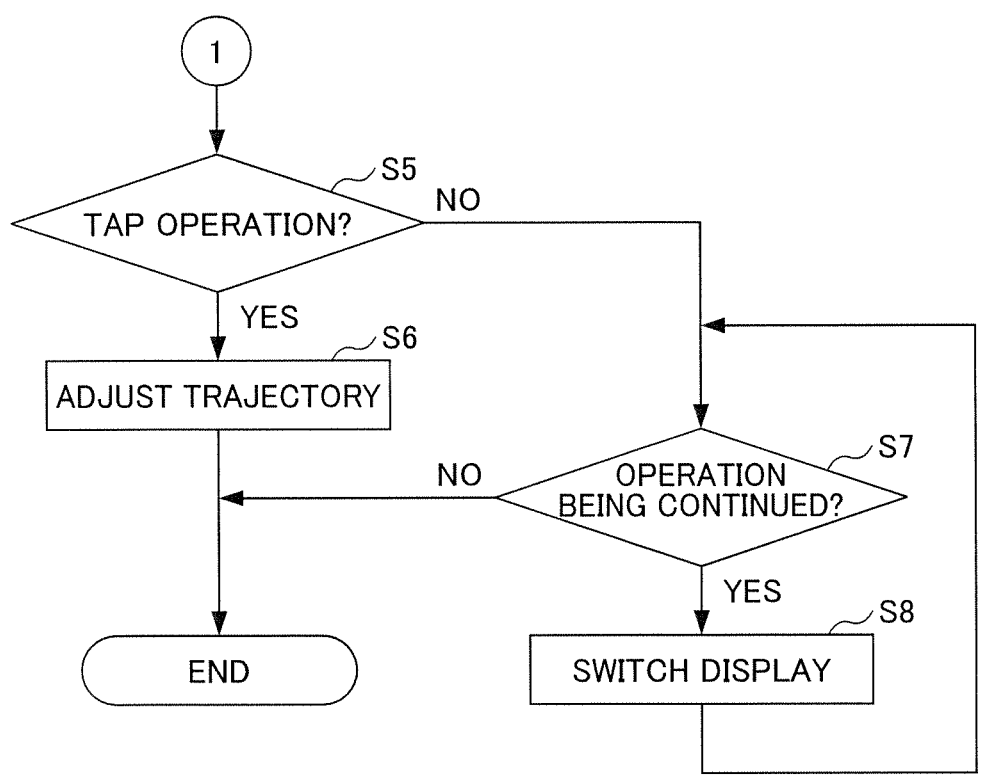
FIG. 6 is a second flowchart showing control processing according to the embodiment.

FIGS. 5 and 6 are flowcharts showing control processing according to this embodiment. This processing is invoked each time a touch operation is detected by the detecting unit 31.

In step S1, the first determination unit 32 determines whether or not a first touch relating to a character movement instruction has been detected by the detecting unit 31. The processing proceeds to step S2 in the case where the determination results in YES, and the processing proceeds to step S5 in the case where the determination results in NO.

In step S2, the first determination unit 32 determines whether or not a drag operation is being continued from the first touch determined in step S1. The processing proceeds to step S3 in the case where the determination results in YES, and the processing proceeds to step S4 in the case where the determination results in NO.

In step S3, the trajectory generating unit 33 generates a character's anticipated movement trajectory corresponding to the drag operation determined in step S2. Furthermore, the processing returns to step S2, and the anticipated movement trajectory is changed in accordance with the drag direction and distance while the drag operation (first touch operation) is being continued.

In step S4, in response to termination of the first touch operation, the control unit 30 accepts a character movement instruction corresponding to the drag direction and distance and the kind of the anticipated movement trajectory based on the second touch operation and updates the internal status of the game and the display of the display 12 (including the movement of the character 40). Then, the control unit 30 terminates the control processing invoked in response to the first touch operation.

In step S5, the second determination unit 35 accepts a second or third touch operation while the first touch (first touch operation) is being continued and determines whether or not this operation is of a predetermined kind (e.g., a tap operation). The processing proceeds to step S6 in the case where the determination results in YES, and the processing proceeds to step S7 in the case where the determination results in NO.

In step S6, the trajectory generating unit 33 sets a character's anticipated movement trajectory by sequentially switching among a plurality of kinds in accordance with the tap operation accepted in step S5. Then, the control unit 30 terminates the control processing invoked in response to the second touch operation.

In step S7, the second determination unit 35 determines whether or not the second touch operation of the predetermined kind, accepted as the second or subsequent operation (e.g., a pinch-in or a pinch-out), is being continued. The processing proceeds to step S8 in the case where the determination results in YES, and the processing is terminated in the case where the determination results in NO.

In step S8, the control unit 30 accepts a display-mode changing instruction corresponding to the second touch operation and updates the internal status of the game and the display of the display 12. Then, the control unit 30 terminates the control processing invoked in response to the second touch operation.

This control processing is an example for embodying the present invention and does not limit the processing method. The control processing based on the first touch and the control processing based on the second or subsequent touch may be executed concurrently, as described above, or the second touch operation may be accepted during the control processing based on the first touch.

According to this embodiment, the game control device 1 can accept the second touch operation in the middle of the first touch operation and change the anticipated movement trajectory based on the first touch operation. Accordingly, the operability regarding movement instructions for a game character is improved.

Furthermore, the game control device 1 can accept the second touch operation in the middle of the first touch operation and make settings to change the display mode, such as increasing or decreasing the display magnification factor of the game space, including the character 40. Accordingly, the player can adjust the visibility of the game while issuing movement instructions for a game character, and thus the operability while proceeding with the game is improved.

The game control device 1 may accept various kinds of touch operations as the second touch operation for changing the anticipated movement trajectory or the display mode, such as a touch at an arbitrary position, a touch in a certain area set by the area setting unit 34, or a swipe or pinch based on a plurality of touches (a multi-touch). Various kinds of setting processing are assigned individually to these kinds of touch operations, which enables the player to make various setting changes during the first touch operation, whereby the operability is improved.

Although the embodiment of the present invention has been described above, the present invention is not limited to the above-described embodiment. Furthermore, the advantages recited in the context of the embodiment are only the most preferred advantages conferred by the present invention, and the advantages of the present invention are not limited to those described in the context of the embodiment.

Although the embodiment has been described in the context of an example of a game employing a game space represented as a pseudo-three-dimensional space, the present invention can be embodied not only in a game space representing a three-dimensional space but also in a game in which only planar images are displayed on a display (touchscreen).

The game control method executed by the game control device 1 is implemented in software. In the case where the method is implemented in software, programs constituting the software are installed on an information processing device (the game control device 1). The programs may be distributed to the user as recorded on a removable medium, such as a CD-ROM, or may be distributed by being downloaded to a user's computer via a network.

EXPLANATION OF REFERENCE NUMERALS

1 Game control device
10 Touchscreen
11 Touch sensor
12 Display
20 Storage unit
30 Control unit 31 Detecting unit
32 First determination unit
33 Trajectory generating unit
34 Area setting unit
35 Second determination unit
36 Trajectory changing unit
37 Movement processing unit
38 Image display unit

The invention claimed is:

1. A non-transitory computer readable medium storing a game control program for causing a computer having a processor coupled to a memory, wherein the game control program controls an execution of a game to execute control processing while the game control program discriminates between different kinds of touch operations on a touchscreen operating as an input/output device for the game, wherein the game involves a movement of a character on the touchscreen, the control processing comprising:
  determining, by the processor, as a first touch operation, an operation in which contact with the touchscreen is maintained and in which a contact position is moved continuously;
  generating, by the processor, an anticipated movement trajectory of the character in the game before moving the character in the game in accordance with a direction amount and a movement amount of the first touch operation;
  determining, by the processor, as a second touch operation, new contact with the touchscreen while the contact in the first touch operation is being continued;
  changing, by the processor, the anticipated movement trajectory when the second touch operation is a tap operation;
  moving, by the processor, the character based on the anticipated movement trajectory in response to a termination of the first touch operation; and
  disabling, by the processor, the first touch operation on the touchscreen while the character is moving in response to the termination of the first touch operation.

2. A game control method in which a computer having a processor coupled to a memory, wherein the game control method controls an execution of a game while the game control method discriminates between different kinds of touch operations on a touchscreen operating as an input/output device for the game, wherein the game involves a movement of a character on the touchscreen, wherein control processing that is executed comprises:
  determining, by the processor, as a first touch operation, an operation in which contact with the touchscreen is maintained and in which a contact position is moved continuously;
  generating, by the processor, an anticipated movement trajectory of the character in the game before moving the character in the game in accordance with a direction amount and a movement amount of the first touch operation;
  determining, by the processor, as a second touch operation, new contact with the touchscreen while the contact in the first touch operation is being continued;
  changing, by the processor, the anticipated movement trajectory when the second touch operation is a tap operation;
  moving, by the processor, the character based on the anticipated movement trajectory in response to a termination of the first touch operation; and
  disabling, by the processor, the first touch operation on the touchscreen while the character is moving in response to the termination of the first touch operation.

3. A game control device that controls an execution of a game, the game control device comprising:
  a touchscreen operating as an input/output device for the game that involves a movement of a character on the touchscreen;
  a processor coupled to a memory;
  wherein the processor is configured to:
    determine, as a first touch operation, an operation in which contact with the touchscreen is maintained and in which a contact position is moved continuously;
    generate an anticipated movement trajectory of the character in the game before moving the character in the game in accordance with a direction amount and a movement amount of the first touch operation;
    determine, as a second touch operation, new contact with the touchscreen while the contact in the first touch operation is being continued;
    change the anticipated movement trajectory when the second touch operation is a tap operation;
    move the character based on the anticipated movement trajectory in response to a termination of the first touch operation; and
    disable the first touch operation on the touchscreen while the character is moving in response to the termination of the first touch operation.

* * * * *